Dec. 3, 1968   G. L. CLARK ET AL   3,414,836
Q-SWITCHED LASER

Filed Nov. 18, 1963   2 Sheets-Sheet 1

GEORGE L. CLARK
RALPH F. WUERKER
INVENTORS

BY
ATTORNEY

Dec. 3, 1968

G. L. CLARK ET AL 3,414,836

Q-SWITCHED LASER

Filed Nov. 18, 1963

GEORGE L. CLARK
RALPH F. WUERKER
INVENTORS

BY

ATTORNEY

United States Patent Office

3,414,836
Patented Dec. 3, 1968

3,414,836
Q-SWITCHED LASER
George L. Clark, Sierra Madre, and Ralph F. Wuerker, Palos Verdes Estates, Calif., assignors to TRW Inc., a corporation of Ohio
Filed Nov. 18, 1963, Ser. No. 324,343
8 Claims. (Cl. 331—94.5)

ABSTRACT OF THE DISCLOSURE

A first and second element which respectively include media in which an inverted population condition can be established are positioned in tandem in a common radiation pathway, wherein a single multiple oscillatory mode can be established. The length of the second element is established in relation to the length of the first element to assure that the second element, when in an unpumped condition, will have a sufficient total attenuation to prevent optical frequency oscillation during a time interval when the first element is being pumped to a predetermined desired population inversion level. Oscillation within the system is inhibited until a desired population inversion is established in the first element.

---

This invention relates to apparatus for generation of coherent electromagnetic radiation within the optical wavelength ranges and more particularly to improved apparatus for generation of optical frequency radiation by means of devices including media in which the stimulated emission of radiation occurs. As used in connection with the present invention, the term "optical frequency radiation" is intended to define radiation within a portion of the electromagnetic spectrum encompassing the wavelength range from about $2 \times 10^6$ Angstroms to about 2,000 Angstroms.

It is known that such radiation may be generated in systems which normally include a resonant cavity in which is disposed a media capable of being excited to a so-called inverted population condition and in which stimulated emission can occur. One requirement of such systems is that the attenuation within the cavity must be lower than the power gain achievable by stimulated radiant energy emission from the medium contained within the cavity. Such systems are known as optical maser systems or, in the case where the radiation is within certain wavelength ranges as "laser" systems. As used in describing this invention, the acronym "laser" shall be understood as meaning systems apparatus or devices for generating optical frequency radiation by means of a population inversion conditionable medium occupying all or part of the volume of a suitable resonator adapted to support oscillatory electromagnetic fields and in which losses are replenished by the amplifying medium through the mechanism of stimulated emission of radiation.

The present invention is not restricted to any particular type of laser medium but in its broader aspects may utilize substantially any three level inverted population conditionable substance capable of induced transition between a pair of energy levels with attendant emission of coherent radiation. A typical three level media is definable as one in which the atoms or molecules can exist at least temporarily in three distinct energy conditions or energy levels with two of the levels having an energy separation corresponding to a frequency within the optical frequency range of interest. Under quiescent conditions, the atoms of active material are distributed among the three energy levels with the population or density of active atoms in each energy level being dictated by the Boltzmann or thermodynamic equilibrium condition. When such material is "pumped" (e.g. by illumination with radiant energy of a wavelength corresponding to the energy difference between a selected pair of energy levels) an inverted population distribution between two adjacent lower energy levels can be established. That is, a non-equilibrium condition can be achieved in which a higher energy level has a greater population or density of active particles than the number or density of particles in a lower energy level. A medium which has been pumped to such an inverted population condition can return to equilibrium by optically induced transition of the molecules or atoms from the higher energy level to the adjacent lower energy level. Specifically, a "pumped" molecule can be stimulated, by irradiation with light of the critical wavelength, to return to the lower energy level and in so doing it releases a quantum of energy in the form of emitted radiation. Radiation produced as a result of induced transition is characteristically in phase with the coherent standing wave in the cavity and adds thereto in a manner to regeneratively amplify the standing wave. When a laser medium is pumped to an inverted population condition high enough so that power obtainable from stimulated emission exceeds the power losses within the cavity, the laser system can oscillate. The maximum oscillatory amplitude of the optical frequency waves within the cavity is dependent upon the extent to which the regenerative power from stimulated emission exceeds the system losses and is therefore dependent upon the magnitude of the inverted population which has been established. Likewise, the rise time, or rate at which oscillation builds up towards a maximum, depends on how high the medium has been pumped.

It has been shown heretofore that high intensity of laser radiation levels may be produced by laser apparatus which includes some means for suddenly altering the loss characteristics of the optical cavity. One such prior art apparatus in which a Kerr cell modulator was used for "Q-switching" of a laser system is described in some detail in an article entitled, "Giant Optical Pulsations from Ruby" by F. J. McClung and R. W. Hellworth, Journal of Applied Physics, volume 33, No. 3 (March 1962). That article describes a system in which a rodlike synthetic ruby crystal is positioned in optical alignment with a Kerr cell modulator within an optical cavity bounded by a pair of reflectors. The function of the Kerr cell modulator in such apparatus is to provide electrically controllable attenuation of the radiation passing therethrough. The Kerr cell modulator is adjusted so that the effective attenuation per pass is relatively high during the time interval when the laser media is being pumped to a desired inverted population condition. The Kerr cell modulator is then suddenly deenergized to remove its attenuation effect and thereby permit low loss multiple transit of the light waves between the parallel reflectors. The reduced attenuation factor of the system enables a rapidly increasing stimulation of the upper energy level atoms or molecules by the increased radiation passing through the media. Thus the "Q-switching" operation suddenly reduces the attenuation factor of the optical cavity so that oscillation builds up in a time of the order of ½ microsecond to a peak power level of several hundred kilowatts. Because of the high amplification factor of the laser medium when it is in a thoroughly pumped condition, the radiation flux density rises rapidly to a high level. Also since stimulated emission is more efficient at high flux densities the atomically stored energy is released in an extremely short time.

The above described Kerr cell modulator method of placing a controllable attenuator in the optical path has a number of disadvantages. The spectral transmissivity characteristic of such devices limits the use of a conventional Kerr cell modulator to a restricted wavelength range. Furthermore, the power density which can be handled by such electro-optical shuttering devices is commonly much lower than that which the laser media and the cavity can tolerate. In addition, laser systems which incorporate a typical nitrobenzene Kerr cell modulator necessarily convert from 10 to 20% of the laser radiation to radiation at 7661 Angstroms by virtue of the so-called coherent Raman scattering effect. Systems using dihydrogen phosphate Pockel cell shutters exhibit a non-linearity which converts some of the laser radiation into second harmonic emission. These effects necessarily reduce the power of the primary laser radiation and thereby degrade the performance of the systems. Thus, in the art of generating enhanced power level optical frequency radiation, there is a need for improved arrangements for suddenly altering the amplification factor of the resonator without power limiting or otherwise degrading the subsequently developed laser radiation.

Accordingly, it is a primary object of the present invention to provide an improved apparatus of the optical maser type for generation of short duration megawatt power level optical frequency radiation pulses.

It is another object of the invention to provide a laser apparatus which self-inhibits optical frequency oscillation during the time required to establish a desired population inversion condition in the amplifying medium, and which thereafter automatically transfers to a phase of the operative cycle in which the amplification of the active medium substantially exceeds the system losses, with the transfer from quiescent operation to maximum amplification being accomplished in a time of the order of a few nanoseconds.

It is a further object of the invention to provide an improved apparatus for generating radiation pulses having radiant power levels of the order of megawatts and which does not require mechanically or electrically controllable shuttering mechanisms or variable attenuation mechanisms such as commonly used in prior art "giant pulse" laser systems.

It is an additional object to provide an improved laser system having increased efficiency of stimulated emission and featuring an arrangement for "Q-switching" which does not power limit or otherwise degrade the subsequently generated laser radiation.

The foregoing and other objects and advantages of the present invention are realized in an exemplary embodiment comprising at least first and second elements which respectively include media in which an inverted population condition can be established. Said elements are preferably positioned in tandem in a common radiation pathway wherein a single multiple oscillatory mode can be established. In accordance with the invention, the length of the second element (in the directions of radiation translation therethrough) is critically established in relation to the length of the first element to assure that the second element, when in an unpumped condition, will have a sufficient total attenuation to prevent optical frequency oscillation during a time interval when the first element is being pumped to a predetermined desired population inversion level. By that arrangement oscillation within the system is inhibited until a desired population inversion is established in the first element. Thereafter, any of various techniques may be employed to incrementally increase the composite amplification factor of the optical pathway to a value just equal to or slightly exceeding the minimum gain required for oscillation. Regenerative action then occurs with energy from stimulated emission being rapidly transferred from the first element and absorbed in the second element. Such absorption regeneratively reduces the attenuation factor of the second element, so that the system changes from substantially zero radiation intensity in the cavity to a radiation power level of megawatts within a rise time of a few nanoseconds.

The foregoing and other features and advantages of the present invention will be best understood by consideration of the following description with reference to the accompanying drawings, which drawings form a part of this application and in which.

Figure 1:
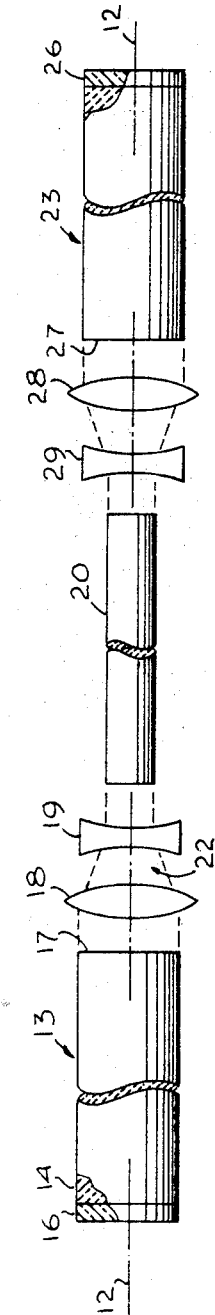
FIGURE 1 is a schematic diagram of one embodiment in accordance with the present invention.

Referring now to FIGURE 1, one exemplary system in accordance with the invention includes first and second emitter elements which are aligned coaxially with the optical axis 12 of an optical cavity or radiation path 22. While the emitter elements may comprise any one of various arrangements for containing a three level laser media, in accordance with preferred embodiments of this invention, the first and second emitter elements take the form of elongated cylindrical crystals or rods 13 and 23 formed of ruby having a concentration by weight of about 0.04% chromium. At the outer end surface of each of the rods 13 and 23, there is provided a reflecting surface 16 and 26 which surfaces define the ends of the radiation path or the boundaries of the optical cavity resonator. The reflecting surfaces 16 and 26 may be vapor deposited metallic film mirrors, however, for best optical efficiency, it is preferred to use multiple dielectric layer reflectors of a known type which provide reflection coefficients of about 0.95 to 0.98. Such reflectors typically transmit approximately 1% of the incident radiation and by that means radiation output can be obtained, for example, from the light transmitted through the reflecting surface 26. Alternatively, useful power can be obtained from the system by intercepting rays propagated out of the sides as diffraction losses.

Adjacent the inner ends 17 and 27 of the laser rods, there is provided a pair of converging lens 18 and 28 which preferably are typical cylindrical double convex lens of a type well known in the art. The radiation beam emerging from the rod 13 for example is converged by the lens 18 and thereby reduced in diameter so that the radiation path in the region between lens 18 and 28 has a substantially smaller cross-sectional area than that of the radiation path in the regions occupied by the rods 13 and 23. In the reduced diameter portion of the radiation path, there is positioned a pair of diverging lens 19 and 29 which preferably are conventional double concave cylindrical lens and which are spaced apart along the axis 12 sufficiently to accommodate therebetween an absorber element 20. The element 20 preferably is an elongated ruby crystal having the same composition as stated heretofore in connection with the elements 13 and 23. However, ruby is not essential for the element 20 and in accordance with broader aspects of the invention, the element 20 may be any device or chamber for containing therewithin a medium in which an inverted population condition can be established and which has a higher radiation attenuating characteristic when it is unpumped than when it is pumped to an inverted population condition. Thus the absorber element 20 appropriately may be considered as comprising an inverted population conditionable means for providing variable attenuation of radiation translated therethrough.

Figure 2:
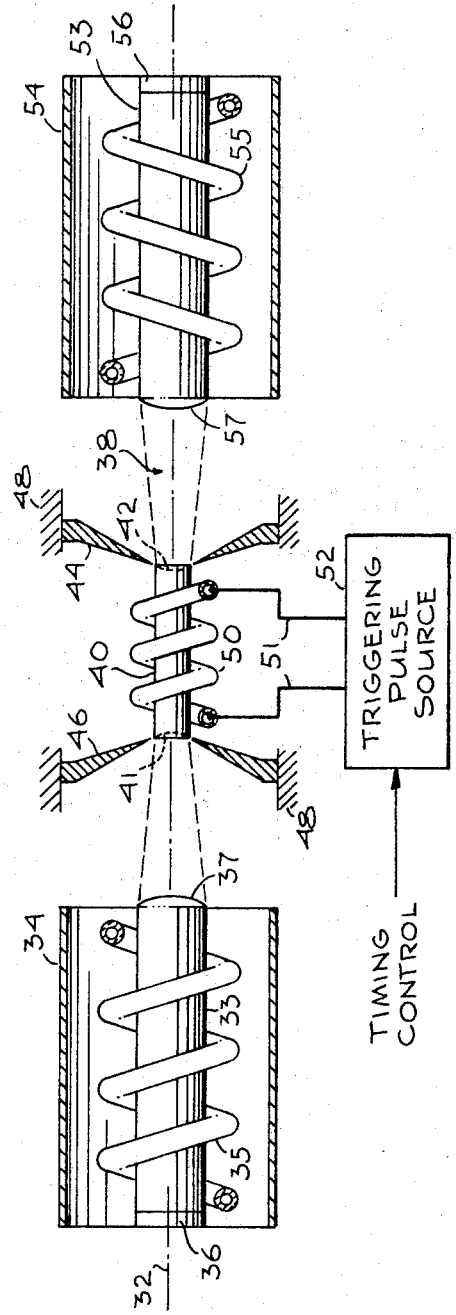
FIGURE 2 is a schematic diagram of another embodiment of a generator employing the principles of this invention.

In the operation of the apparatus of FIGURE 1, the two emitter rods 13 and 23 are optically pumped in the conventional manner by a pumping lamp (not shown) which is preferably of the same type as illustrated in FIGURE 2 and described hereinafter. As the population of the upper energy levels in the emitter rods 13 and 23 increases so that an inverted population condition is established the gain or amplification factor of the emitter rods increases in direct proportion to the inverted population density difference. Thus, as soon as an inverted population condition is established in the rods 13 and 23 oscillation within the optical pathway would occur if it were not for the presence of the absorber 20. Since the absorber 20 is in an unpumped or equilibrium condition, it absorbs a substantial portion of any radiation which is directed therethrough from the elements 13 and 23. That is, absorber 20, when in an unpumped or equilibrium condition operates as an attenuator in the optical cavity to inhibit or delay the initiation of oscillation. As the pumping of rods 13 and 23 continues, the combined gain of the emitter rods eventually becomes high enough to offset the attenuation factor of the absorber 20.

When the composite gain of the system rises to a value of 1.0, oscillation within the optical cavity begins. That is, a few rays generated by spontaneous emission in the first emitter rod 13, for example, pass through the lenses 18, 19 and through the absorber 20 to induce emission from the upper energy level atoms of the second emitter rod 23. Absorption of a portion of the initial radiation by the absorber 20 increases the energy level of some of the atoms or molecules of the medium of the absorber. That is, radiation from the elements 13 and 23 pumps the absorber 20 and begins increasing the population of its upper energy level. As the absorber 20 is pumped toward an inverted population condition, its absorption or attenuation coefficient decreases proportionately. The result is that the composite gain of the entire system increases very rapidly in a regenerative manner. As the gain increases stimulated emission from the elements 13 and 23 increases so that the radiation intensity within the path rapidly reduces the attenuation coefficient of the absorber 20. Thus, a rapid transfer from quiescent to a multimegawatt radiation power level takes place within an oscillation rise time of a few nanoseconds. Since the absorber 20 is of a smaller diameter than the emitter rods 13 and 23 the absorber has a substantially smaller volume of active material within the radiation pathway than do the emitter rods 13 and 23. Because of that difference in volume, a relatively small fraction of the energy initially stored by the emitter rods is required to pump the absorber 20 to a zero attenuation condition (an inverted population condition such that its transmissivity or gain is 1.0).

As stated above, the absorber 20 operates to keep the system from oscillating while the population densities of the emitter rods 13 and 23 are being pumped to a high degree of inversion. The transmittance of an unpumped absorber 20 having a length $L_a$ is $$T = \exp(\sigma_a L_a N_0) \quad (1)$$

where $\sigma_a$ is the atomic cross section for the absorption of resonant radiation and $N_0$ is the population density in the ground state of the absorber.

In a preferred embodiment employing ruby rods having a chromium ion density of about $1.6 \times 10^{19}$ ions per cubic centimeter the atomic cross section $\sigma$ has a value of about $2.5 \times 10^{-20}$ square centimeters. This concept of the atomic cross section $\sigma$ may be best understood by considering that each chrominum ion in the ruby rod has a certain probability of reacting with or absorbing radiation. Thus, a light ray traversing the ruby absorber 20 will be attenuated to an extent dependent upon the absorption probability factor $\sigma_a$ and the density $N_0$ of chromium ions in the absorber.

Similarly, radiation traversing pumped emitter rods 13 and 23 will be amplified to an extent dependent upon the atomic cross section for fluorescent wavelength emission $\sigma_e$ of the emitter rod, the relative density of upper energy level chromium ions (i.e. the population inversion difference $\Delta = (N_2 - N_1)$), and upon the length of the emitter rod. More succinctly expressed, the amplification or gain of a pumped emitter rod of length $L_e$ is $$G = \exp(\sigma_e L_e \Delta) \quad (2)$$

where $\Delta$ is the population density difference $(N_2 - N_1)$ between a pair of energy levels which have an energy separation corresponding to a frequency within the frequency range of interest, and $\sigma_e$ is the cross section for emission of radiation by transition from the higher to lower of said pair of levels.

For the system shown in FIGURE 1, which includes two pumped emitter rods 13 and 23, the over-all system gain is $$G_0 = G_1 G_2 T = \exp[2\sigma_e L_e(N_2 - N_1) - \sigma_a L_a N_0] \quad (3)$$

The condition for onset of oscillation is that the overall system gain must rise to unity; that is:

$$G_0 = \exp[2\sigma_e L_e(N_2 - N_1) - \sigma_a L_a N_0] \geq 1.0 \quad (4)$$

For a self-shuttered system in accordance with the invention, the length of the absorber 20 is chosen so that the net gain of the system is less than unity until the desired high degree of population inversion in the emitter rods 13 and 23 has been achieved. If the desired population inversion is $\Delta = N_2 - N_1$, the required length of absorber 20 is obtained from 4 as follows:

$$2\sigma_e L_e(N_2 - N_1) - \sigma_a L_a N_0 = 0$$

Therefore:

$$L_a = 2L_e\left(\frac{\sigma_e}{\sigma_a}\right)\left(\frac{N_2 - N_1}{N_0}\right) \quad (5)$$

The foregoing Equation 5 establishes the length of absorber 20 expressed in terms of $\sigma_e$, $\sigma_a$, $L_e$ and $N_0$ necessary to hold off oscillation until a specified population inversion $N_2 - N_1$ is reached.

Thus any system conforming to Equation 5 is within the scope of this invention in that it provides self-shuttering of the laser systems such as that of FIGURE 1. However, to establish a reasonably good efficiency in such systems it is desirable that the energy which may be retrieved from the pumped emitter rods 13 and 23 should appreciably exceed that required to reduce the absorption of the absorber 20. Specifically, the externally available output energy $E_{net}$, which can be derived from the system is simply the amount of retrievable stored energy in the emitter rods, $E_{re}$, less the energy $E_a$ required to invert population in the absorber. Thus, $$E_{net} = E_{re} - E_a \quad (6)$$

The energy which can be retrieved from a laser element, such as emitter rod 13, of length $L_e$ and radius $r_e$ is given by $$E_{re} = \frac{1}{2}(hc/\lambda)(\pi r_e^2 L_e)(N_2 - N_1) \quad (7)$$

where $hc/\lambda$ is the quantum energy of the fluorescent transition and $(2\pi r_e^2 L_e)$ is the volume of the emitter rod 13. The factor of one half in the last quantity results from the fact that the gain of the emitter rod decreases to 1.0 when the population equalizes.

Conversely, as the absorber 20 absorbs radiant energy, the active ions thereof are pumped, one by one, from the ground state to the upper energy level. As $N_2$ increases the attenuation factor decreases. The amount of energy $(E_a)$ required to equalize the $N_2$ and $N_1$ populations in the absorbing rod 20 may be specified in terms of the volume of the absorber and the energy per transition:

$$E_a = (hc/\lambda)(\pi r_a^2 L_a)\frac{(N_0)}{2} \quad (8)$$

where $r_a$ and $L_a$ are the radius and length of the absorber 20, and $N_0$ is the initial population density in the ground state of the absorber.

Substituting 7 and 8 into 6, one gets the net optical energy, $E_{net}$, which can be derived from a self-shuttering system such as that of FIGURE 1.

$$E_{net} = hc/\lambda 2 A_e L_e \frac{(N_2-N_1)}{2} - A_a L_a \frac{(N_0)}{2} \quad (9)$$

where $A_e$ and $A_a$ are the geometric cross sectional areas of the emitter rods 13, 23 and the absorber 20, respectively.

It should be noted that the condition for oscillation specified by Equations 4 and 5 gives only the ratio of lengths $L_a/L_e$ which will prohibit oscillation at stored energy levels below a preselected population inversion density difference $\Delta = N_2 - N_1$, and those equations involve only the lengths, and not the volumes of the emitter and absorber. In contrast, the available net energy, Eq. 9, is a function of the rod volumes only and does not involve the lengths. The basic principle of operation of the self-shuttered laser systems of this invention is now clear: The reduction in cross sectional area of the light beam by the intermediate optics 18, 19 before it passes through the absorber 20 allows an absorber of relatively small volume to hold off oscillation of the system for as long as is necessary to establish a desired high population inversion in the emitter elements. Subsequent pumping of the small absorber volume $A_a L_a$ does not require an appreciable amount of the available energy $E_{re}$.

Substitution of Eq. 5 into Eq. 9 yields $$E_{net} = E_{re} 1 - \left[\frac{\sigma_e r_a^2}{\sigma_a r_e^2}\right] \quad (10)$$

Equation 10 specifies that the net energy derivable from a system in accordance with the invention is directly proportional to the gross energy $E_{re}$ which can be derived from the pumped media, and asymptotically approaches that energy $E_{re}$ as the diameter of the absorber 20 becomes small relative to the diameter of the emitter. Thus, for a given or constant size of the emitter rods and a specified emitter inversion $\Delta$, Equation 10 gives the size of the absorber rod 20 required to provide the output energy $E_{net}$ which may be needed for by a particular application or use of the apparatus.

From the foregoing, it can be appreciated that an apparatus as illustrated in FIGURE 1 and as parametrically specified by Equations 5 and 10, is capable of being pumped to a much higher than usual level of stored energy in the emitter elements 13 and 23 before oscillation is spontaneously initiated. A detailed analysis of the dynamics of the transient operation by which the system transfers from quiescent to maximum oscillation will not be given here. It is sufficient for present purposes to note that a system of the above described type can be shown to have an oscillation rise time of the order of 1 nanosecond and can produce power levels of at least about 200 megawatts.

FIGURE 2 illustrates a further embodiment in accordance with the present invention which is generally similar to that of FIGURE 1 but differs principally in that it includes no separate refracting elements such as the lens 18 and 19. In this embodiment, the converging of the optical path is accomplished by convex refraction surfaces 37 and 57 ground on to the inner ends of the emitter rods 33 and 53. The emitter rods 33, 53 and the absorber 40 are arranged in optical alignment along the central axis 32 substantially in the same geometrical organization as the apparatus of FIGURE 1. Similarly, the emitter rods 33 and 53, which preferably comprise conventional laser type pink ruby, are provided with reflecting surfaces 36 and 56, corresponding to surfaces 16 and 26 of the apparatus of FIGURE 1. The emitter rods 33 and 53 are peripherally encompassed by corresponding spiral pumping lamps 35 and 55 which may, for example, be xenon filled flash lamps of a type now well known in the art. Externally of the lamps 35 and 55 the emitter assemblies are encompassed by cylindrical metallic reflectors 34 and 54 which serve to concentrate a maximum portion of the light from the lamps on the active media of emitter rods 33 and 53. In the apparatus of FIGURE 2, the ends of the ruby absorber 40 are provided with concave refracting surfaces 41 and 42 which act as divergent lens for establishing a beam of substantially parallel rays through the absorber 40. Adjacent the ends of the absorber 40 there is preferably provided a pair of funnel-like baffles 44 and 46 which have high reflectivity internal surfaces and which serve to shield the absorber 40 from pump radiation generated in lamps 35 and 55. The operation of the apparatus illustrated in FIGURE 2 is substantially identical in all particulars to that of the apparatus of FIGURE 1 as described and analyzed heretofore.

The self-shuttered laser systems thus far described will necessarily suffer from time jitter in a system or application where they are used to produce repetitive radiation pulses. This time jitter (uncertainty as to the time of occurrence of a given output pulse) arises from the fact that pumping by means of radiation from flash lamps has some randomness, and consequently the precise time at which the gain of the emitter elements 33 and 53 will rise to a level sufficient to initiate oscillation is not precisely predictable. FIGURE 2 illustrates an anti-jitter arrangement which may be used, optionally, to overcome the above difficulty. The anti-jitter means preferably comprises a spiral flash lamp 50 which is connected to a triggering pulse source 52 by way of in-leads 51. The triggering pulse source provides timed voltage pulses having an extremely rapid rise time so that the lamp 50 has a critically timed and rapidly rising light output. The light from lamp 50, impinging on the absorber 40, operates to incrementally pump the media of absorber 40 to incrementally increase the population of the upper energy level thereof. Preferably, the pulse source 52 is programmed by appropriate circuitry (not shown) to fire the lamp 50 just before the critical population density in the emitter elements 33 and 53 is reached. By that arrangement, an incremental increase in the population inversion of the absorber 40, provided by the anti-jitter means, is sufficient to increase the composite gain of the system through unity gain to thereby drive the system into oscillation at precisely the desired time.

Figure 3:
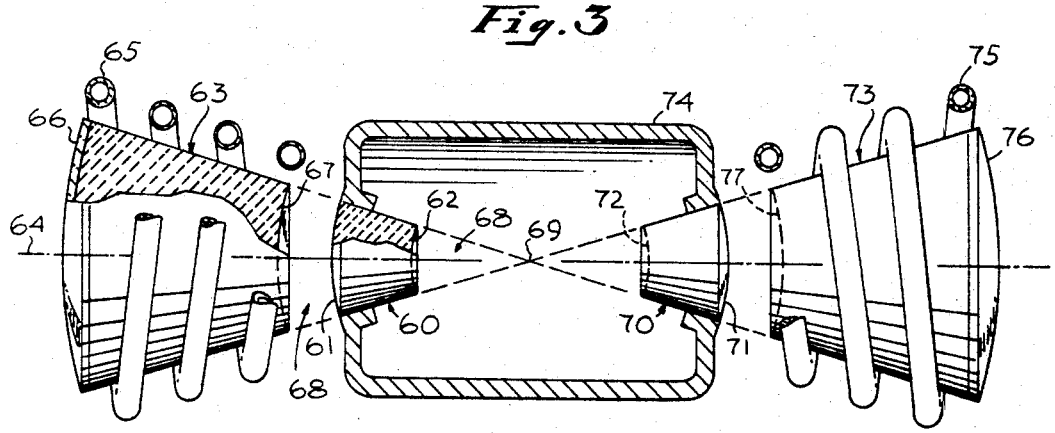
FIGURE 3 is a schematic diagram of a concentric optical cavity embodiment in accordance with the invention.

FIGURE 3 illustrates a further embodiment in accordance with the invention wherein the emitter elements 63 and 73 take the form of conic sections having convex surfaces at their outer ends with reflecting surfaces 66 and 76 applied thereto. The reflecting surfaces 66 and 76 preferably are multiple dielectric layered reflectors of the type discussed heretofore in connection with the apparatus of FIGURE 1. The emitter elements 63 and 73 are provided with pumping lamps 65 and 75 corresponding to the similar elements 35 and 55 of FIGURE 2. The inner ends of the emitter elements have concave surfaces 67 and 77 ground therein so that the light path 68 comprises two symmetrically arranged cones which meet at the center of symmetry 69 of the system. In the apparatus of FIGURE 3, the absorber is divided into two portions 60 and 70 each of which may be a conical section of ruby crystal of the type mentioned heretofore with the outer surfaces 61 and 71 being convex and the inner surfaces 62 and 72 being concave. It has been determined that systems as illustrated in FIGURE 3, when operated at multi-megawatt power levels will cause ionization of the air at the common center of curvature 69 where the entire energy of the system is focused at substantially a single point. Such electrical breakdown or ionization of air in the center of the system would, of course, be highly undesirable. Accordingly, where a system as illustrated in FIGURE 3 is to be operated at high power levels the light path 68 between the absorber crystals 60 and 70 desirably should be evacuated. To that end, the system of FIGURE 3 includes a cylindrical vacuum chamber 74 illustrated in cross section having circularly apertured end plates into which the absorber crystals 60 and 70 may be sealed by conventional vacuum sealing techniques such as for example O-ring gaskets, not shown.

In addition, if necessary or desirable for a particular application the absorber crystals 60 and 70 of the apparatus of FIGURE 3 may be provided with anti-jitter triggering lamps and circuitry similar to the apparatus 50–52 of FIGURE 2. The system illustrated in FIGURE 3 has the very important advantage that all of the optical surfaces 66, 67, 61, 62, 72, 71, 77 and 76 are spherical. The provision of spherical surfaces throughout the system greatly simplifies and economizes manufacture of the emitter and absorber elements. In the system of FIGURE 3, the light paths are such that the spherical lens surfaces require no correction of the type which is usually necessary in optical systems using spherical surface lens. That is, as is well known, systems using spherical optical lens notoriously suffer distortion which increases as the distance from the optical axis increases. For example, in systems such as illustrated in FIGURE 2, optimum performance would require that correction lens be added to the systems or else that the light path 38 be restricted to only the central portion of the spherical surfaces. Such requirements of course tend to degrade the efficiency of the system such as that illustrated in FIGURE 2. In contrast, the system shown in FIGURE 3 may use spherical surfaces throughout and is not subject to optical distortion which would have to be corrected. That is, in the system of FIGURE 3, each and every light ray passes through each and every optical inner phase normal to the spherical surface. Thus since the system does not involve reflection at optical surfaces the distortion normally present in optical systems embodying spherical surfaces is not a problem in the apparatus of FIGURE 3.

Figure 4:
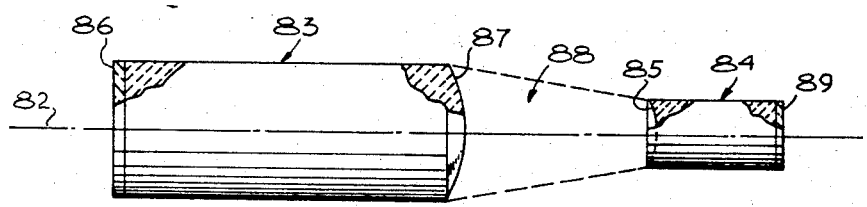
FIGURES 4 and 5 schematically illustrate alternative arrangements employing the principles and providing the advantages of the invention.

FIGURE 4 illustrates a further embodiment in accordance with the present invention which preferably is, in all respects, similar to the apparatus of FIGURE 2 with the exception that it represents one half of the symmetrical system illustrated in FIGURE 2. That is, the apparatus of FIGURE 4 comprises one emitter element 83 which may be identical to the emitter element 33 of the apparatus of FIGURE 2 and one absorber 84 which preferably is one-half as long as the element 40 of the apparatus of FIGURE 2. Thus the optical path 88 of the apparatus of FIGURE 4 is not symmetrical and is bounded at its outer ends by a reflecting surface 86 at the outer end of the emitter 83 and a reflecting surface 89 disposed on the right hand end of the absorber 84. The operation of the apparatus of FIGURE 4 is, of course, substantially the same as that of the systems described heretofore.

Figure 5:
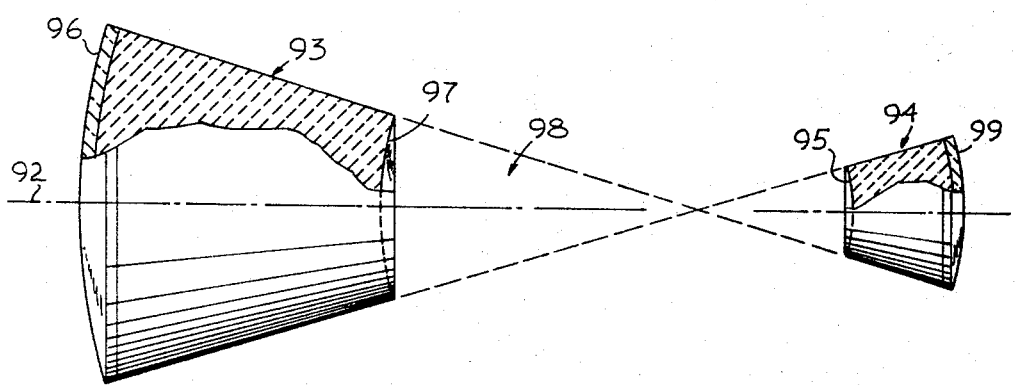

FIGURE 5 illustrates a further embodiment in accordance with the present invention which is generally similar to that of FIGURE 3 except that it comprises a single emitter element 93 and a single absorber element 94. The emitter element 93 may be identical to the corresponding element 63 of FIGURE 3. The absorber 94 is a conic section of ruby crystal having a concave inner face 95 and a convex outer end on which there is disposed a dielectric reflecting surface 99. The apparatus of FIGURES 4 and 5 have the possible advantage for some applications of economy of material and components.

There has been described, a new technique and various apparatus for generating nanosecond-duration-multi-megawatt optical frequency radiation pulses. The concepts are general and are applicable to any materials capable of population inversion and exhibiting stimulated emission of coherent radiation. Apparatus in accordance with the present invention is particularly advantageous in that it avoids the use of mechanical or electro-optical shuttering mechanisms. Accordingly, such apparatus enables the generation of multi-megawatt power levels in regions of the spectrum where electro-optical mechanisms such as Kerr cell modulators are non-transparent or highly inefficient. The concepts of the present invention can be applied to any of various arrangements in which each emitter assembly comprises a plurality of ruby crystals or other emitter elements optically coupled to operate in unison.

The various systems in accordance with this invention may be used in conjunction with substantially any of the known three level population inversion materials. The pump mechanisms may be any high intensity energy source encompassing a wavelength approximately equal to that of the atomic transition required to achieve population inversion in the active medium which is used. Thus the invention is not restricted to the particular pumping lamp arrangements described heretofore.

The nature of the reflecting surfaces 16, 26, 36, etc. is not a critical feature of this invention. The reflectors may be mirrors of vapor-deposited metallic films. In the interest of obtaining high reflectivity and thus providing greater cavity efficiency, multiple dielectric layered reflectors, which may provide for reflection coefficients in excess of .95 and preferably in excess of .98 may be used. The coherent light generated or amplified in the cavity is transmitted through the reflectors. Typically such reflectors are designed to transmit approximately one percent of the incident light, whereby output may be had directly therethrough. Alternatively, means for deriving output energy may comprise a partially silvered reflecting surface or a minute uncoated area near the center of one of the reflecting surfaces. Further it will be appreciated that concepts of the present invention do not at all require that the end reflectors be disposed on the laser rods or even intimately associated with the ends of the active media members. For example, the end reflectors 16, 26, 36, 56, etc., may alternatively take the form of dielectric layered mirrors spaced an appreciable distance from the ends of the active elements 14, 23, etc.

It should be understood that the invention is not limited to arrangements using identical active media for both the emitter elements and the absorber. That is, Equations 5 and 10 encompass systems in which the atomic cross section $\sigma_e$ of the emitter elements is widely different from the cross section for absorption $\sigma_a$ of the absorber. Accordingly, by choosing emitter and absorber materials such that $\sigma_e$ is small compared to $\sigma_a$ it is feasible to construct a system generally similar to those illustrated in FIGURES 1 and 2 and 4 in which $r_a$ is equal to $r_e$. With the light path in such a system having the same diameter throughout, the requirement for converging optics is eliminated. This has the advantage of improved cavity Q and economy of manufacture. One requirement of such systems is that the active media of the absorber must have a transition, from the ground state to a higher energy level, for which the transition energy $hc/\lambda$ is substantially the same as the energy of the induced fluorescent transition of the emitter which is being used to produce stimulated emission. The foregoing may be accomplished, for example, in a system wherein the transitionable atoms or molecules of the emitter and absorber are identical but are carried in different host materials. It is known that the atomic cross section $\sigma$ of a given transitionable medium is dependent upon the host material in which the medium is dispersed. Thus the same active medium dispersed in two different host materials gives differing values of $\sigma_e$ and $\sigma_a$ but with identical values of $hc/\lambda$ in the emitter and absorber.

In all of the foregoing, the present invention has been described as embodying three energy level types of laser materials. This is for the reason that systems in accordance with the concepts of the present invention depend upon the absorption of fluorescent radiation from the emitter elements in the absorber elements and pumping of the absorber elements by that radiation. It is to be noted that generally four level laser materials do not absorb and hence are not pumped by the same wavelength of radiation at which they fluoresce. This results from the fact that the fluorescence of four level materials terminates at a state which is above the ground state. Thus systems in accordance with the present invention will not normally employ four level laser materials. However, it is contemplated that certain four level materials may be used in systems of the type disclosed if the four level laser material is heated to a temperature sufficient to populate the first level above the ground level when so heated certain four level laser materials can be caused to absorb radiation of the same wavelength which they emit. Accordingly, it is contemplated that the present invention in its broader aspects encompass the use of at least certain four lever laser materials when the necessary adjustments are made in the system to overcome the above mentioned difficulties.

While the present invention has been described with reference to certain specific embodiments only, it will be clear to those skilled in the art that it is not so limited but is susceptible of various changes and modifications without departing from the spirit and scope of the concepts thereof.

The embodiments of the invention in which an exclusive property or privilege is claimed are defined as follows:

1. An optical or infrared maser system comprising:
a radiation path bounded at its ends by a pair of reflecting elements defining a resonant cavity;
first and second members each including an active medium characterized by at least two distinct energy levels having an energy separation corresponding to a frequency within the optical frequency range of interest, and which is capable of being excited to a population inversion condition;
both of said members being positioned within said path and said second member having a length along said path given by the relation:

$$L_2 = L_1 \left(\frac{\sigma_1}{\sigma_2}\right)\left(\frac{\Delta}{N_0}\right)$$

wherein $L_1$ and $L_2$ are the lengths of said first and second members, $\sigma_1$ and $\sigma_2$ are the atomic cross sections for resonance fluorescence of the active mediums of said first and second members respectively, $\Delta$ is the inverted population difference of active atoms of said first member which is desired to be attained, and $N_0$ is the number density of active atoms in the ground state of the media of said second member; and
means pumping said first member to establish a population inversion condition therein.

2. An optical or infrared maser system comprising:
a radiation path having a predetermined axis and bounded at its ends by a pair of reflecting elements defining a resonant cavity;
first and second members which include active media capable of being excited to population inversion conditions;
said second member having a length in the direction of said axis given by the relation:

$$L_2 = L_1 \left(\frac{\sigma_1}{\sigma_2}\right)\left(\frac{N_2 - N_1}{N_0}\right)$$

wherein $L_1$ and $L_2$ are the lengths of said first and second members, $\sigma_1$ and $\sigma_2$ are the respective atomic cross sections for resonance fluorescence of the active media of said first and second members, $N_2 - N_1$ is the numerical population inversion which is desired to be attained in said first member, and $N_0$ is the numerical population density in the ground state of the media of said member; and
means pumping said first member to establish a population inversion condition therein.

3. A high peak power laser system comprising:
a multiple reflection radiation path bounded by a pair of reflecting elements defining a resonant cavity;
first and second quantities of active media positioned in said pathway, with said media being characterized by at least two distinct energy levels having an energy separation within the optical frequency range of interest and by being adapted to be excited to a population inversion therein between said first and second separated energy levels and said path having a cross-sectional area in the region occupied by said first quantity substantially larger than the corresponding path area in the region occupied by said second quantity;
said second quantity having an active length given by the relation:

$$L_2 = L_1 \left(\frac{\sigma_1}{\sigma_2}\right)\left(\frac{N_2 - N_1}{N_0}\right)$$

wherein $L_1$ and $L_2$ are the active lengths along said path of said first and second quantities, $\sigma_1$ and $\sigma_2$ are respectively the resonance fluorescence cross sections of the mediums of said first and second quantities, $N_2 - N_1$ is the numerical population inversion which is desired to be attained in said first quantity, and $N_0$ is the numerical density of active atoms in the ground state of the media of said second quantity; means pumping said first quantity to establish a population inversion condition therein.

4. An optical frequency radiation generating apparatus comprising:
a multiple reflection radiation path bounded at its ends by first and second means for low loss reflection of rays impinging thereat;
radiation emitter means including an inverted population conditionable medium disposed within a first portion of said path;
means arranged about said medium for pumping the same to establish a desired population inversion between a pair of spaced energy levels of its energy level system;
radiation absorber means including an inverted population conditionable medium disposed within a second portion of said path in a manner such that radiation emanating from said emitter means is constrained to pass through the absorber means and to be attenuated thereby to an extent inversely dependent upon the population inversion of the medium thereof;
the lengths of said emitter means and absorber means being proportioned in accordance with the relation:

$$\frac{L_a}{L_e} = \left(\frac{\sigma_1}{\sigma_2}\right)\left(\frac{N_2 - N_1}{N_0}\right)$$

wherein $L_e$ and $L_a$ are the active lengths along said path of said emitter means and absorber means respectively,
$\sigma_e$ and $\sigma_a$ are the respective atomic cross sections for resonance fluorescence of the media of said emitter and absorber means,
$N_2 - N_1$ is the numerical inverted population difference desired to be produced in the emitter medium between two separate energy levels thereof, and $N_0$ is the total number of atoms of active material per unit volume in the ground state of the absorber medium in the medium;
and with said first portion of said path having an average cross-sectional area several times larger than that of said second portion.

5. A coherent radiation generator comprising:
a radiation propagation path bounded at its ends by a pair of radiation reflective devices defining a resonant cavity;
first and second emitting means including inverted population conditionable media for emitting coherent radiation in response to radiation induced transition of atoms of said media between two distinct energy levels thereof;
absorbing means including a quantity of an inverted population conditionable substance disposed in said pathway for at least intermittently absorbing radiation directed therethrough from said first and second emitter means, with such absorption being effective to pump said substance from a quiescent equilibrium condition toward a non-equilibrium population inversion condition and with the attenuation factor of the absorbing means being variable inversely as a function of the degree of population inversion of said substance;

and said absorbing means having a length substantially equal to that specified by the relation:

$$L_a = L_e \left(\frac{\sigma_e}{\sigma_a}\right)\left(\frac{N_2 - N_1}{N_0}\right)$$

wherein $L_e$ is the sum of the lengths of said emitting means, $\sigma_e$ and $\sigma_a$ are respectively the atomic cross sections for resonance fluorescence of the emitting means media and the absorbing means substance, $N_2 - N_1$ is the numerical population inversion which is desired to be established in the media of said emitting means, and $N_0$ is the density of atoms of active material in the ground state in said substance; and means pumping said first and second emitting means to an inverted population condition.

6. A system for generating optical frequency coherent radiation pulses comprising:

first and second radiation translating means disposed respectively in different portions of a radiation propagation pathway; with said first and second translating means each comprising a population inversion conditionable medium which is characterized by at least two distinct energy levels having an energy separation in the optical frequency range of interest, and which is adapted to be energized to a desired population inversion between said two separate energy levels;

said first and second means being relatively dimensioned in accordance with the relation:

$$L_2 = L_1 \left(\frac{\sigma_1}{\sigma_2}\right)\left(\frac{N_2 - N_1}{N_0}\right)$$

where $L_1$ and $L_2$ are the effective dimensions along said pathway of said first and second translating means respectively, $\sigma_1$ and $\sigma_2$ are the atomic cross sections for resonance fluorescence of the media of said first and second translating means respectively, $N_2 - N_1$ is the minimum population inversion which is desired to be attained between said separate energy levels of the medium of said first translating means, and $N_0$ is the total density of atoms of active material in the ground state of the media of said second translating means; and means for pumping said first translating means to establish at least said minimum population inversion therein.

7. The apparatus of claim 6 in which said first translating means comprises first and second elongated members formed of a solid state laser substance, with said members being spaced apart along and longitudinally aligned with the radiation pathway, and with said second translating means being positioned in said pathway intermediate the adjacent ends of said members.

8. A system for generating coherent radiation pulses in accordance with claim 7 and which is further characterized in that said second translating means comprises an elongated member formed of a solid state laser substance having an atomic cross section for absorption differing from the atomic cross section for emission of the laser substance of said first and second members.

References Cited

UNITED STATES PATENTS

| | | | |
|---|---|---|---|
| 3,258,717 | 6/1966 | Katzman | 331—94.5 |
| 3,270,291 | 8/1966 | Kosonocky | 331—94.5 |

JEWELL H. PEDERSEN, *Primary Examiner.*

W. L. SIKES, *Assistant Examiner.*